US012452978B2

(12) United States Patent
Lou et al.

(10) Patent No.: US 12,452,978 B2
(45) Date of Patent: Oct. 21, 2025

(54) TABLE LAMP

(71) Applicant: SIGNIFY HOLDING B.V., Eindhoven (NL)

(72) Inventors: Di Lou, Shanghai (CN); Huai Zhou Liao, Shanghai (CN); Zhong Huang, Shanghai (CN); Hua Jie Luo, Shanghai (CN); Alexander Henricus Waltherus Van Eeuwijk, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/720,846

(22) PCT Filed: Dec. 22, 2022

(86) PCT No.: PCT/EP2022/087413
§ 371 (c)(1),
(2) Date: Jun. 17, 2024

(87) PCT Pub. No.: WO2023/131538
PCT Pub. Date: Jul. 13, 2023

(65) Prior Publication Data
US 2025/0081311 A1 Mar. 6, 2025

(30) Foreign Application Priority Data

Jan. 5, 2022 (WO) ................. PCT/CN2022/070296
Mar. 1, 2022 (EP) ..................................... 22159477

(51) Int. Cl.
*H05B 47/115* (2020.01)
*F21S 4/28* (2016.01)
(Continued)

(52) U.S. Cl.
CPC .............. *H05B 47/115* (2020.01); *F21S 4/28* (2016.01); *F21S 6/003* (2013.01); *F21V 21/22* (2013.01);
(Continued)

(58) Field of Classification Search
CPC ....... F21S 6/003; H05B 47/115; H05B 47/155
See application file for complete search history.

(56) References Cited

U.S. PATENT DOCUMENTS 7,564,368 B2 * 7/2009 Segall .................. H05B 47/165
340/331
2009/0161374 A1 6/2009 Teng et al.
(Continued)

FOREIGN PATENT DOCUMENTS

CN 205535239 U 8/2016
CN 210372987 U 4/2020
(Continued)

*Primary Examiner* — William N Harris

(57) ABSTRACT

Provided is a table lamp for illuminating a task area of a table. A plurality of light sources are provided, each with a different illumination direction toward the task area. A control arrangement is provided such that the plurality of light sources are controlled based on a position of the observer. Specifically, the control arrangement determines whether each light source meets criteria governing whether the observer may experience direct and reflected glare. Indeed, if a specular peak intensity angle of the light source is less than a reflected glare avoidance angle corresponding to a position of an observer, and a sight angle from the light source to the observer is greater than a direct glare avoidance angle corresponding to the position of the observer, then the light source may be controlled to illuminate the task area. In this way, specularly reflected light glare, as well as direct light glare, may be avoided.

13 Claims, 10 Drawing Sheets

(51) Int. Cl.
  *F21S 6/00*    (2006.01)
  *F21V 21/00*   (2006.01)
  *F21V 21/22*   (2006.01)
  *F21V 21/26*   (2006.01)
  *F21V 21/28*   (2006.01)
  *F21Y 103/10*  (2016.01)
  *F21Y 115/10*  (2016.01)
  *H05B 47/10*   (2020.01)
  *H05B 47/155*  (2020.01)

(52) U.S. Cl.
  CPC ........... *F21V 21/26* (2013.01); *H05B 47/155* (2020.01); *F21V 21/28* (2013.01); *F21Y 2103/10* (2016.08); *F21Y 2115/10* (2016.08); *H05B 47/10* (2020.01)

(56) References Cited

U.S. PATENT DOCUMENTS

| | | | |
|---|---|---|---|
| 2012/0206050 A1 | 8/2012 | Spero | |
| 2013/0278150 A1* | 10/2013 | Lou | H05B 47/115 315/155 |
| 2016/0316543 A1* | 10/2016 | Liu | H05B 47/11 |
| 2016/0334069 A1* | 11/2016 | Ji | F21V 17/02 |
| 2019/0032892 A1 | 1/2019 | Lin | |

FOREIGN PATENT DOCUMENTS

| | | | |
|---|---|---|---|
| JP | 2014071966 A | 4/2014 |
| WO | 2014115048 A1 | 7/2014 |
| WO | 2014180876 A1 | 11/2014 |

\* cited by examiner

TABLE LAMP

CROSS-REFERENCE TO PRIOR APPLICATIONS

This application is the U.S. National Phase application under 35 U.S.C. § 371 of International Application No. PCT/EP2022/087413, filed on Dec. 22, 2022, which claims the benefit of European Patent Application No. 22159477.3, filed on Mar. 1, 2022 and International Application No. PCT/CN2022/070296, filed Jan. 5, 2022. These applications are hereby incorporated by reference herein.

FIELD OF THE INVENTION

The present invention relates to the field of lighting, and in particular, to the field of table lighting.

BACKGROUND OF THE INVENTION

The most frequently addressed glare issues for desk lighting is direct glare, which comes from the light source directly. Despite addressing this issue, reflected glare was almost inevitable may not be addressed. This may be particularly problematic if an observer reads from a glossy paper-based medium.

A typical approach to mitigate this problem is to use polarized light. In theory, polarized light may be used to reduce reflection for a very specific viewing angle. However, once an observer deviates from that specific viewing angle, reflected glare becomes an issue. Thus, polarized light often proves relatively useless in practice.

By way of explanation, reflected glare is mainly caused by the specular components of the total reflection that occur on an illuminated surface. Within the total reflection, the diffusive components usually form a visually comfortable adaptation luminance for the eyes. However, specular components, if directed towards eyes of an observer, may cause a visually uncomfortable sensation for the observer. Indeed, for glossy paper, specular components account for a large portion of the total reflection than for non-glossy paper. As a result, reflected glare is much more severe for glossy paper materials.

SUMMARY OF THE INVENTION

The invention is defined by the claims.

According to an aspect of the invention, there is provided a table lamp for illuminating a task area of a table, the table lamp comprising:
  a plurality of light sources, each light source being adapted to emit light in a respective illumination direction toward the task area; and
  a control arrangement configured, for each of the plurality of light sources, to control the light source to illuminate the task area of the table responsive to:
    a specular peak intensity angle of the light source being less than a reflected glare avoidance angle corresponding to a position of an observer; and
    a sight angle from the light source to the observer being greater than a direct glare avoidance angle corresponding to the position of the observer.

In other words, there is provided a table lamp for illuminating a task/work area of a table (i.e. a desk). A plurality of light sources is provided, each with a different illumination direction toward the task area. A control arrangement/means is provided such that the plurality of light sources is controlled based on a position of the observer. Specifically, the control arrangement determines whether each light source meets criteria governing whether the observer may experience direct and reflected glare. Indeed, if a specular peak intensity angle of the light source is less than a reflected glare avoidance angle corresponding to a position of an observer, and a sight/lighting angle from the light source to the observer is greater than a direct glare avoidance angle corresponding to the position of the observer, then the light source may illuminate the task area. In this way, specularly reflected light glare, as well as direct light glare, may be avoided.

By way of explanation, reflected glare is primarily caused by specular components of total reflection, while diffusive components form a visually comfortable illumination for the eyes. The direction of the specular reflection from a light source may be predictable, given a known illumination direction of the light source. Thus, by leveraging this knowledge, alongside knowledge of where an observer is positioned, the specularly reflected light incident to the observer's eyes may be suppressed/reduced by controlling the light sources accordingly.

Moreover, to avoid direct light glare, the light source must be placed outside an observer's field of view (i.e. a direct glare avoidance angle). This may be achieved by comparing the illumination direction of the light source with a direct glare avoidance angle corresponding to the position of the observer. In this way, the observer may not directly see light from the light source while observing the task area.

Thus, ensuring that only light sources having specular peak intensity angle less than a reflected glare avoidance angle, and a sight angle from the light source to the observer being greater than a direct glare avoidance angle, illuminate the task area is key for reducing an amount of glare an observer may experience. Thus, light sources may be controlled in order to ensure comfortable lighting for the observer when viewing the task area (i.e. when reading a book, or viewing an item).

Indeed, it has been realized that by carefully selecting the position and illumination direction of light sources, glare in the form of reflected light and direct light may be avoided. When a plurality of light sources are provided in with a number of different illumination directions, each of the light sources may be independently controlled based on how light from said light sources is directed.

In some embodiments, the specular peak intensity angle of the light source may be an angle between a specular peak direction of the light source and a reference plane, the reflected glare avoidance angle may be an angle between the reference plane and a direction between the position of the observer and the position of the light source, and the reference plane may be perpendicular to a direction between the position of the observer and a center of the task area.

In some embodiments, the direct glare avoidance angle may correspond to a field of view of the observer.

This ensures that light sources are controlled based on whether the light source is within the field of view of the observer, and indeed the extent to which the light source is inside or outside the observer's field of view. Thus, glare from direct light from light sources may be suppressed.

In some embodiments, the field of view of the observer may be at least 50° from the direction from the position of the observer and a center of the task area.

Indeed, the observer may see a light source that is up to 50 degrees from their principle direction of sight. The principle direction of sight (i.e. centre point of their field of view) will likely be the centre task area (or close to the centre) when observing the task area. Thus, this measure ensures that the observer is less likely to suffer from uncomfortable glare directly from a light source.

In some embodiments, the table lamp may further comprise an observer position detection means configured to detect the position of the observer.

For example, the table lamp may further comprise a pressure sensor, or a camera system in order to determine where the observer is situated. Thus, the light sources may be controlled to reduce glare more effectively.

In some embodiments, the table lamp may further comprise a task area position detection means configured to determine a position of the task area.

In this way, the task area does not have to be a fixed location relative to the table lamp, but may be moved. As a result, the light sources may be controlled based on the task area position as well. This may prove particularly useful when the observer wishes to move, for example, an item they are observing from the task area, as a reflected glare may still be accounted for and suppressed.

In some embodiments, the task area of the table may correspond to an area of the table that the observer is observing.

Thus, the control of the light sources may be such that the observer does not experience reflected glare at the location that they are observing/looking at. In this way, they may be able to see more effectively and comfortably. This may be particularly useful for when the subject of observation is glossy paper, where reflected light renders the contents of the paper unreadable.

In some embodiments, the table lamp may further comprise an interface unit configured to receive light control instructions from the observer, and the control arrangement may be further configured, for each of the plurality of light sources, to control the light source based on the received light control instructions.

In this way, the observer may be granted more control over the lighting level, and thus can adjust the control of the light sources in a way which improves their personal comfort. For example, some observers may be more sensitive to reflected light, or may have a wider or narrower field of view for direct light. Indeed, the observer may wish to control some of the light sources to suit their preferred ambiance.

In some embodiments, the control arrangement may be configured to control each of the plurality of light sources by: turning the light source on, turning the light source off, setting an illumination level of the light source, adjusting the illumination direction of the light source, changing the color of the light source, or changing the color temperature of the light source.

Indeed, the light sources may be controlled in these ways in order to ensure comfortable lighting conditions for the observer. For example, light sources which may provide a small amount of reflected light glare, and no direct light glare, may be controlled to reduce their illumination level, whereas light sources directly in the line of sight of the observer may be switched off, or controlled to have a different illumination direction.

In some embodiments, the table lamp may further comprise a string of LEDs, the string of LEDs comprising the plurality of light sources.

In this way, a task area may be surrounded by the string of LEDs, providing light in a plurality of different directions.

In some embodiments, at least one of the plurality of light sources may comprise an LED cluster.

The LEDs may be clustered, so that the computational burden of individually controlling the plurality of light sources may be reduced. Indeed, a greater illumination level may be provided by a cluster of LEDs, rather than individual LEDs, providing meaningful lighting.

In some embodiments, the illumination direction of at least one of the plurality of light sources may be configured to avoid specular reflection toward the position of the observer.

Thus, there is at least a light source which may not specularly reflect light toward the observer. As a result, the observer may always be provided with illumination for the task area that does not result in glare from specular reflected light.

In some embodiments, the illumination direction of a first one of the plurality of light sources may be from a first side of the observer to a second side of the observer, and the illumination direction of second one of the plurality of light sources may be from the second side of the observer to the first side of the observer Having illumination from light sources at each side (i.e. a left side and right side of the observer, with respect to an observation direction), may ensure homogenous illumination of the task area. Indeed, the means of illumination may suppress specular reflection of light toward the observer, instead reflecting the light toward the opposite side. Meanwhile, the light sources are provided outside of the field of view of the observer, suppressing glare directly from the light sources.

In some embodiments, the table lamp may further comprise a frame component configured to house the plurality of light sources.

In some embodiments, the plurality of light sources may be configured to be retractable from a first position configured to avoid specular reflection toward the position of the observer to a second position configured to save space.

In this way, the observer may save space by choosing to retract the light sources when not in use, or when glare is not an issue, while deploying the light sources when glare may be an issue, or when space-saving is not a concern.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
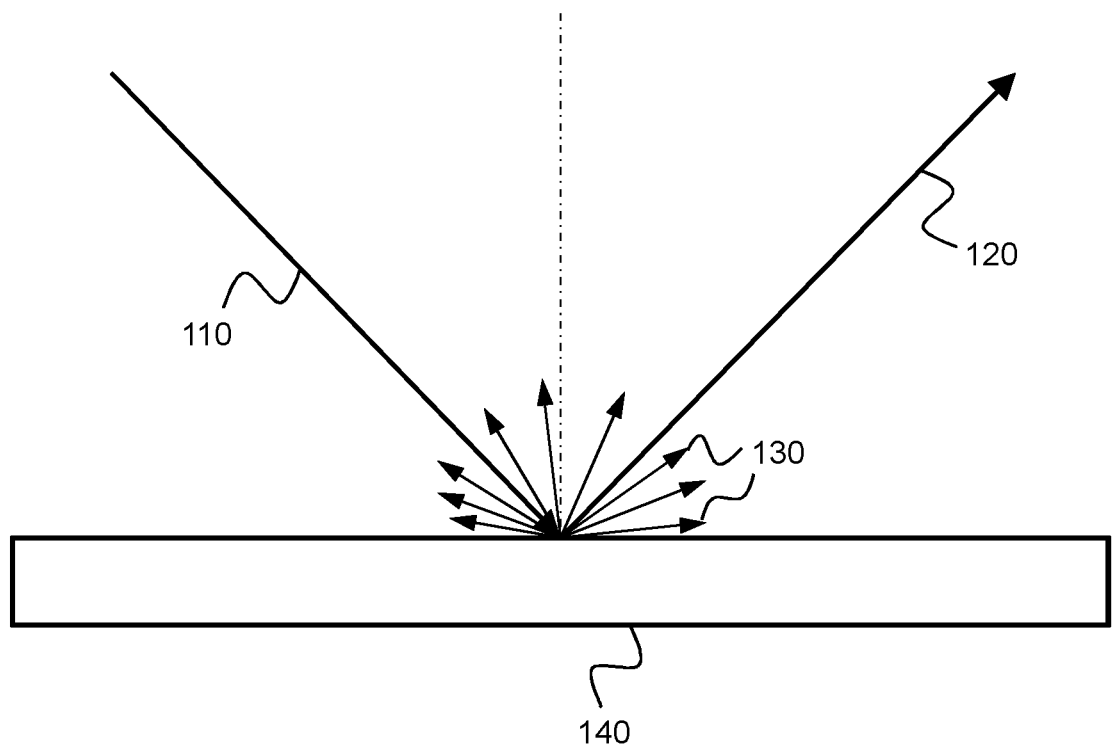
FIG. 1 is a diagram representing the difference between diffusive and specular components of total reflection from a surface.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. If the term "adapted to" is used in the claims or description, it is noted the term "adapted to" is intended to be equivalent to the term "configured to".

According to proposed concepts, a number of possible solutions may be implemented separately or jointly. That is, although these possible solutions may be described below separately, two or more of these possible solutions may be implemented in one combination or another.

Embodiments of the invention provide a table lamp for illuminating a task area of a table. In particular, a plurality of light sources is provided, each having a different illumination direction toward the task area. A control arrangement is provided to determine both a reflected and direct light incidence relationship for each of the plurality of light sources. This is achieved by determining whether a specular peak intensity angle of the light source is less than a reflected glare avoidance angle corresponding to a position of an observer, and whether a sight angle from the light source to the observer being greater than a direct glare avoidance angle corresponding to the position of the observer. Based on the incidence relationships, each of the light sources are controlled (i.e. if the above criteria are both met, then the light source may be controlled to illuminate the task area). In this way, direct and indirect glare may be suppressed, improving visual comfort of an observer of the task area.

More specifically, a specular peak intensity angle (which may relate to the illumination direction) of each of the light sources is compared to a reflected glare avoidance angle. This may indicate a degree to which specular components of reflected light may be directed toward eyes of the observer. For example, if the specular peak intensity angle and the reflected glare avoidance angle are similar, then light may be reflected into the eyes of the observer, whereas if they are different then the observer may not suffer from reflected glare.

Moreover, an illumination direction is compared to a direct glare avoidance angle. This may indicate a degree to which light from each light source may directly illuminate the eyes of the observer.

Thus, the control arrangement has the capability to control each of the plurality of light sources in such a way that the observer may only see diffusive components of reflected light from the task area. This level of lighting may thus be more comfortable for the observer, and may also provide homogenous lighting that suppresses shadowing.

FIG. 1 represents how light (i.e. light emitted by light sources of a table lamp) may reflect off a surface (i.e. a task area). Light 110 incident to the surface 140 may be absorbed, specularly reflected, or diffused. Diffused components 130 of the reflected light may form a visually comfortable illumination of the surface 140. Specular components 120 act similarly to light reflected by a mirror. In other words, specular components 120 of the reflected light have a direction based on the incident angle.

Usually, if specular components 120 of reflected light are directed towards eyes of an observer, the observer will experience a visually uncomfortable sensation, and may not be able to see the task area at all. The key to solve this issue lies in the fact that this problem only arises if specular components 120 are directed towards the eyes. Specular reflection is like reflection by a mirror, in that the direction of the reflected light is decided by the direction of the incident light and its angle to the surface. Since table lamps do not normally emit light in a narrow beam, the emitted light has a wide range of incident angles. Considering a typical scenario of using table lamp (i.e. where the light source is placed in front of the user, to the front left, to the front middle, or to the front right), reflected light is incident to the observers eyes.

Figure 2:
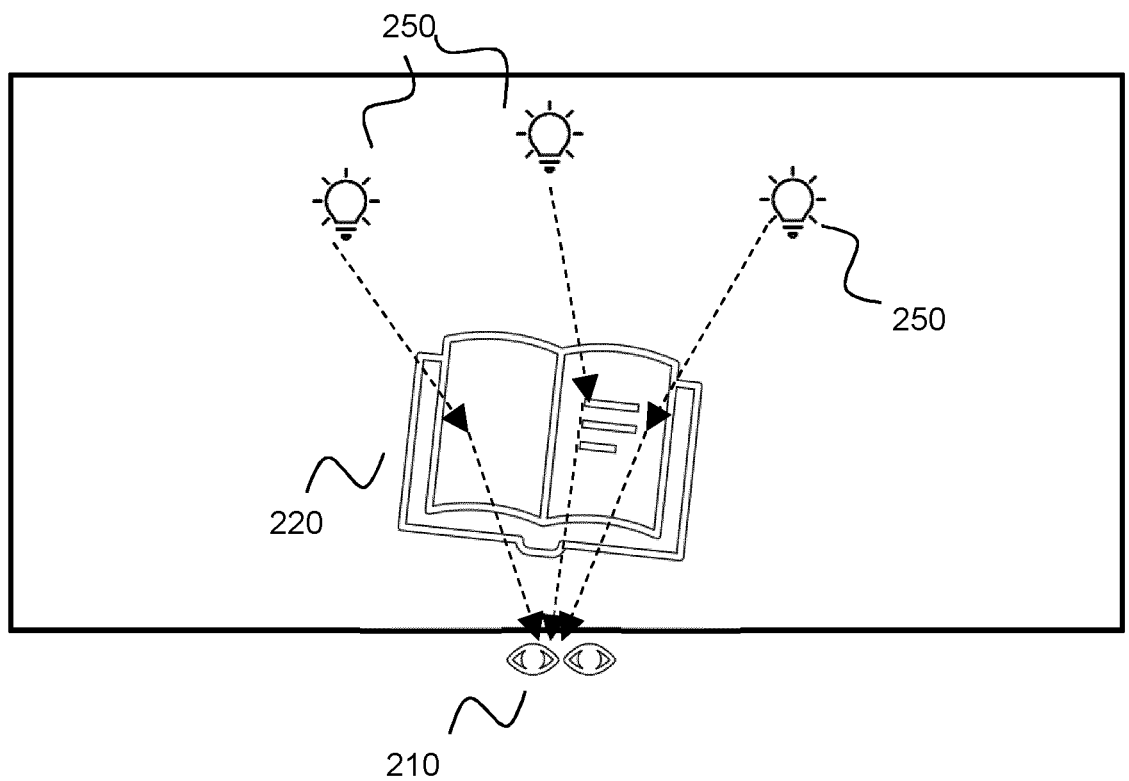
FIG. 2 is a diagram representing specular reflection from light sources positioned in front of an observer.
Figure 3:
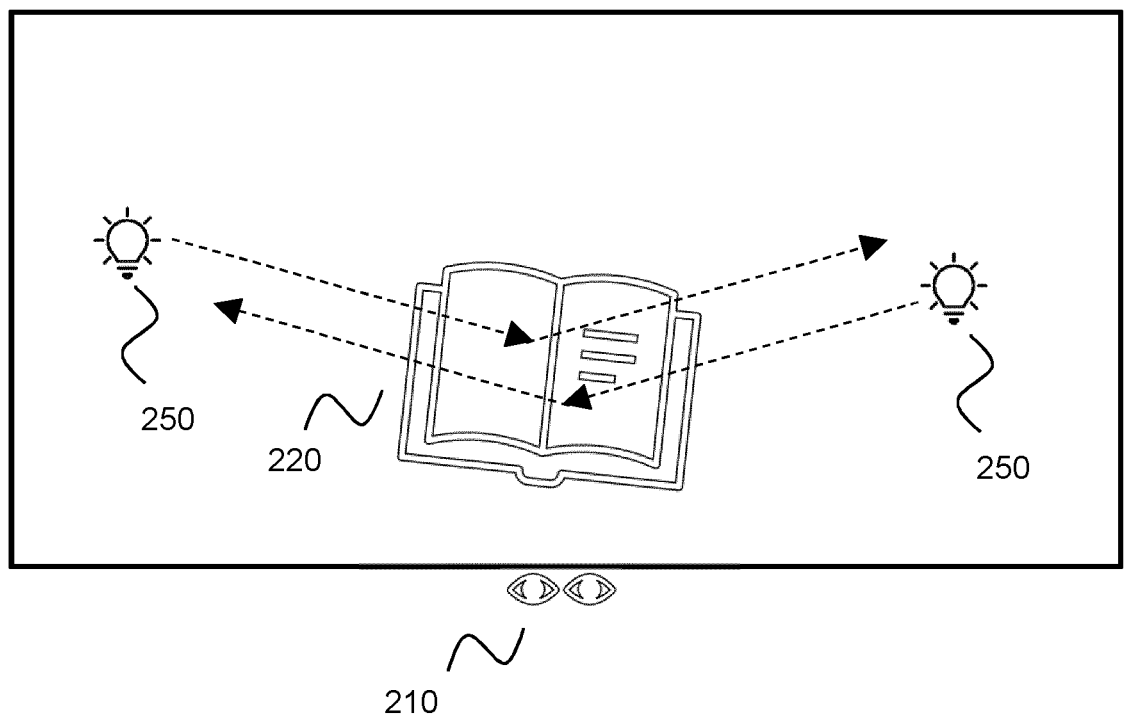
FIG. 3 is a diagram representing specular reflection from light sources positioned to the sides of an observer.

By way of illustrative example, FIG. 2 presents illumination of a task area 220 by light sources 250 positioned in front of an observer 210. In this case, specular components of the reflected light are likely to be incident to the observer 210. Conversely, FIG. 3 shows that if the light sources 250 are placed to the side (i.e. a left side and a right side) of the observer 210, then specular components of reflection may not be incident to the observer 210.

Thus, in order to solve the reflected glare issue while preserving the normal task lighting requirement for horizontal illuminance, embodiments of the invention are provided that may include two light sources, one placed on the left side of the observer, and another on the right side of the observer with respect to a task area. The aiming (i.e. illumination direction) of the left light source is towards the task area, such that light reflects towards the right of the task area, the aiming of the right light source is towards the task area, such that the light reflects towards the left of the task area. Thus, all the specular components from the reflection will never reach the eyes and reflect away to the sides. Meanwhile, the diffusive components from the reflection will form a good adaptation luminance which is beneficial to observer's eyes.

In other words, to realize the total glare elimination (direct & reflected), there are two key criteria that should be fulfilled at the same time, including: The light sources must not be directly seen by the observer, meaning that the light source must be placed within a certain positional range. The peak brightness direction of the light source must not cause any specular reflection from the task area surface, meaning that the illumination direction must be within a certain angle range.

A table lamp is normally put on a table so that its light source is about the similar height with respect to an observer's eyes over the surface of the table. Light output of such table lamp is projected towards the task area of the table. The vertical component of the light output beam is of much less importance than its horizontal component. Therefore, for the purpose of conciseness and clarity, the directions and angles in the context of the invention are defined or calculated only with their components in a (horizontal) plane parallel to the surface of the table where the task areas lays.

Figure 4:
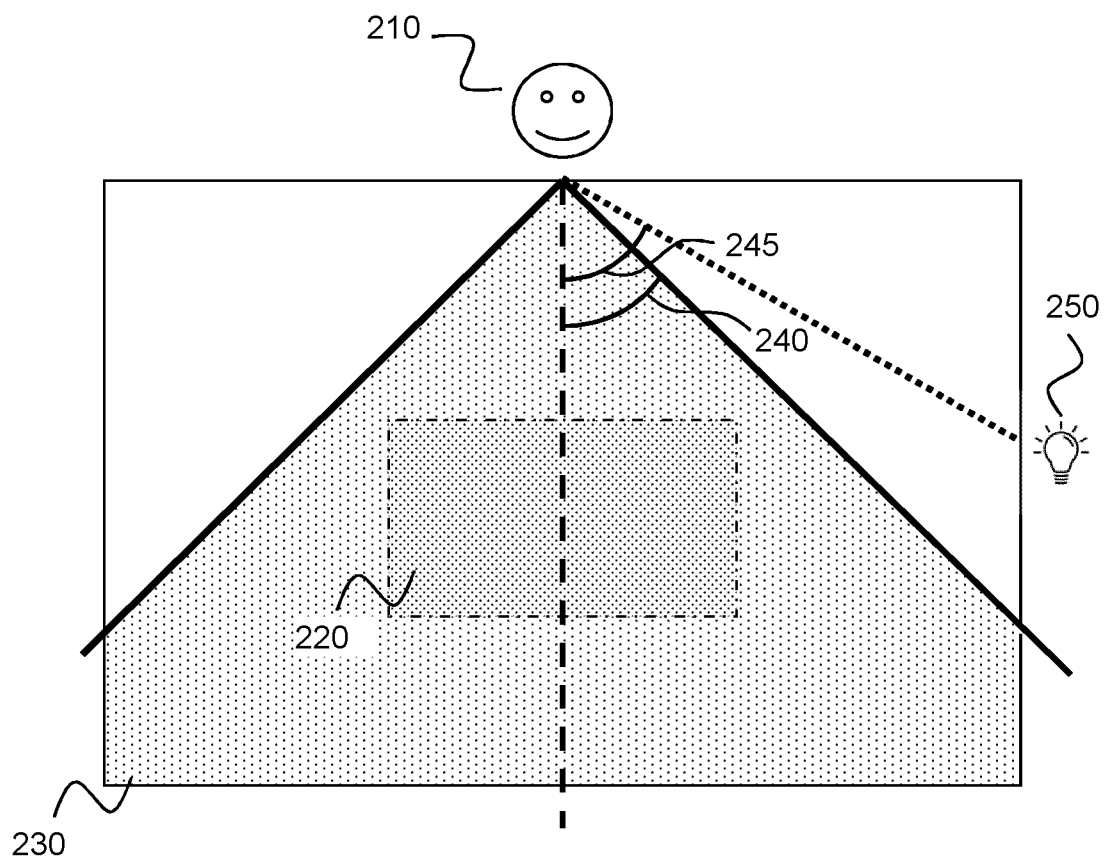
FIG. 4 is a simplified diagram of an observer's field of view with respect to a task area.

FIG. 4 represents the requirements for meeting the condition of criteria (i) above. Indeed, FIG. 4 presents a simplified representation of a field of view 230 of an observer 210 from a birds-eye-view.

Specifically, an observer 210 that is observing/looking at the task area 220 (or an item within the task area 220) is depicted. The first shaded area represents the task area 220, while the second shaded area represents a position where the light source may be within the field of view 230 of the observer 210. In this way, a light source provided within the second shaded area 230 may cause a direct light glare for the observer 210 when observing the task area 220, while no direct glare may be caused by a light source outside the second shaded area 230.

Accordingly, an angle 240 (i.e. a direct glare avoidance angle) may correspond to a field of view 230 of the observer 210. The angle 240 may be around 50°. However, the angle 240 is not restricted to this, and may vary depending on the observer 210, and specified needs of the observer 210.

Thus, when the angle 245 between the observer 210 and the light source 250 greater than the direct glare avoidance angle 240, the observer 210 may not be able to directly see the light source. In this way, the observer may not experience direct glare.

Figure 5:
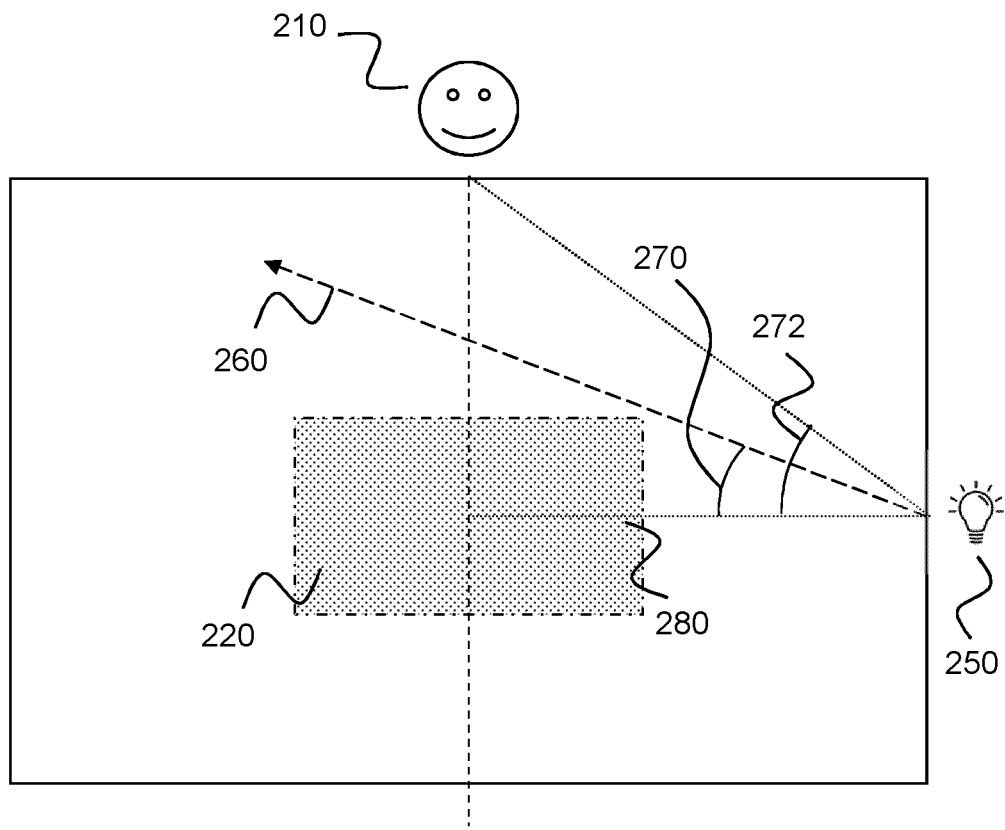
FIG. 5 is a simplified birds-eye-view diagram of specular reflection from a light source.
Figure 6:
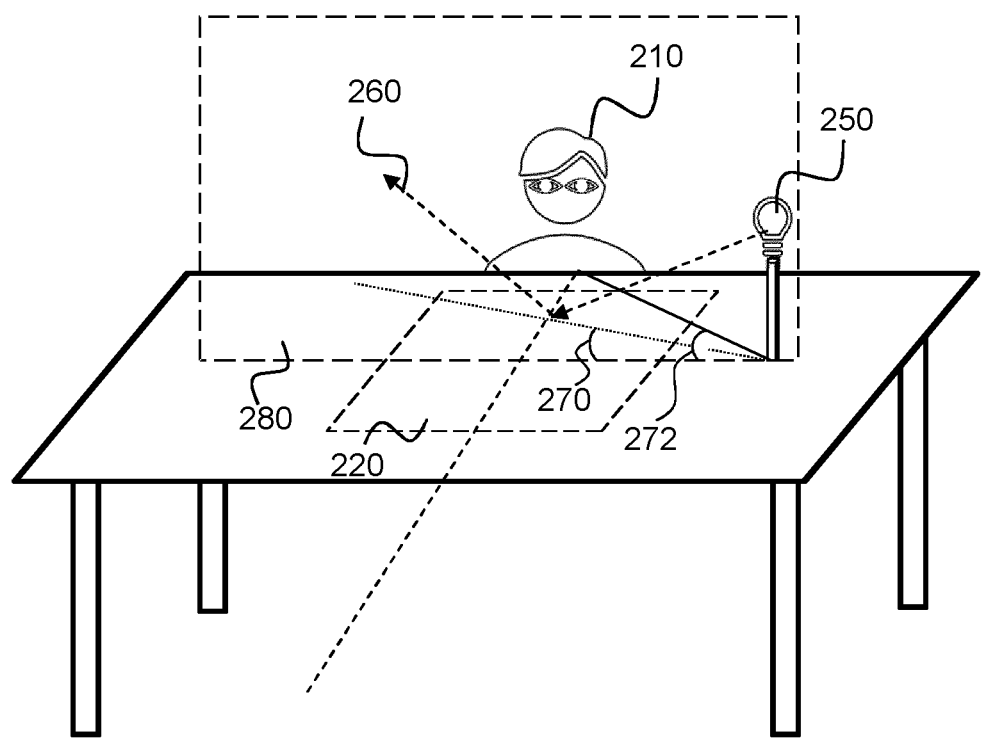
FIG. 6 is a simplified isometric view diagram of specular reflection from a light source.

FIGS. 5 and 6 represent the requirements for meeting the condition of criteria (ii) above. Specifically, FIG. 5 presents a simplified representation of specular reflection 260 toward an observer 210 from a birds-eye-view, while FIG. 6 presents the same from an isometric view.

More particularly, the specular peak intensity angle 270 of the light source 250 must be smaller than a reflected glare avoidance angle 272 (i.e. an angle between the light 250 source and the observer 210) to ensure that no light is reflected toward the position of the observer 210. Thus, if this condition is met, specular components 260 of reflected light may not be seen by the observer 210 when observing the task area 220.

Put another way, the specular peak intensity angle 270 of the light source 250 is an angle between a specular peak direction 260 of the light source 250 and a reference plane 280. The reflected glare avoidance angle 272 is an angle between the reference plane 280 and a direction between the position of the observer 210 and the position of the light source 250. In these cases, the reference plane 280 is perpendicular to a direction between the position of the observer 210 and a centre of the task area 220. By comparing the specular peak intensity angle 270 and the reflected glare avoidance angle 272 a level of specularly reflected light 260 incident to the observer 210 may be assessed.

Indeed, if the specular peak intensity angle 270 and the reflected glare avoidance angle 272 are greatly different, then no light may be specularly reflected by a surface of the task area 220 into the eyes of the observer 210 (instead going to the left of the observer 210 in the represented example). However, if the specular peak intensity angle 270 and the reflected glare avoidance angle 272 are similar, then specular components 260 of reflected light may meet the eyes of the observer 210 causing uncomfortable glare.

Figure 7:
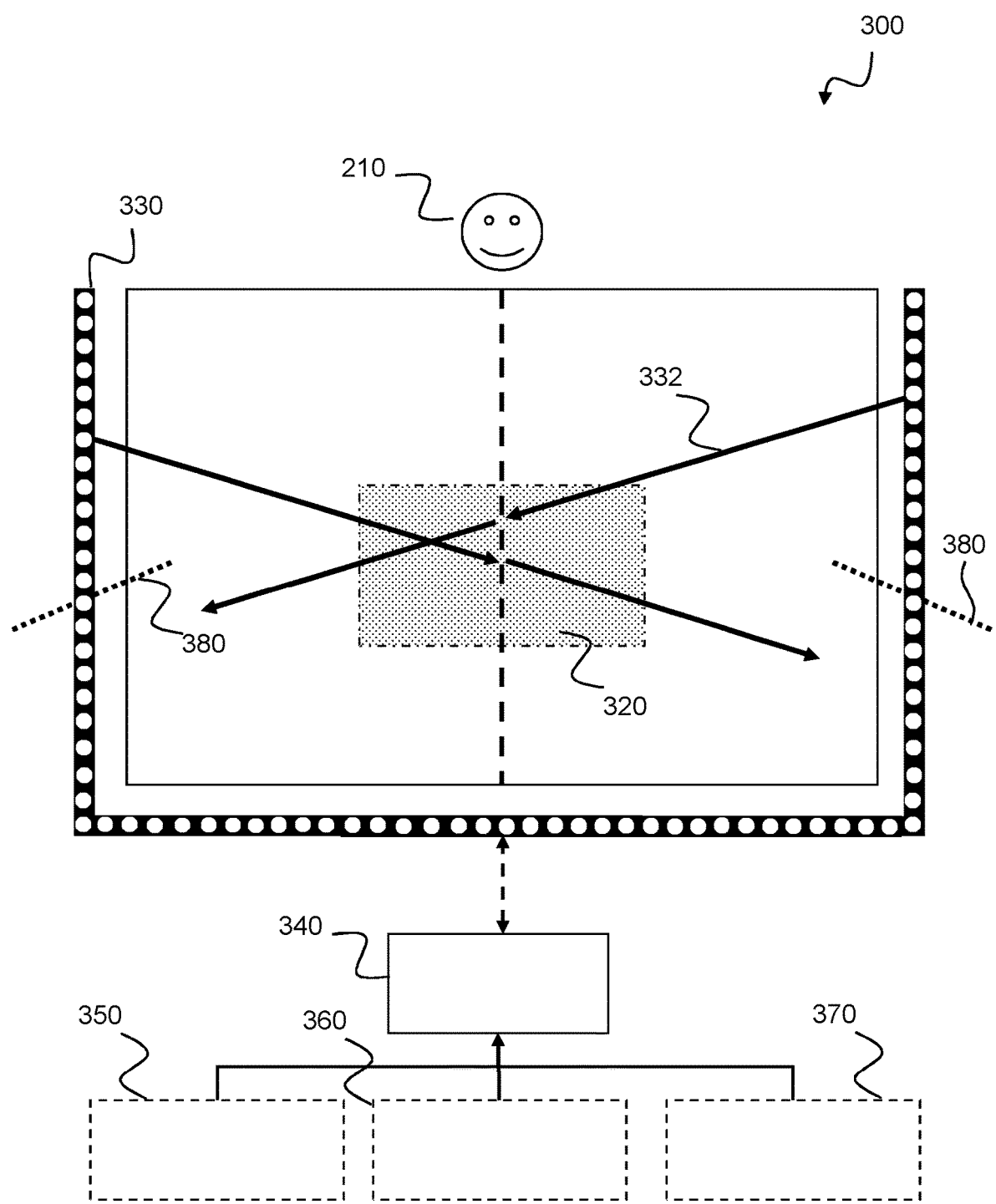
FIG. 7 is a schematic diagram of a table lamp for illuminating a task area according to an exemplary embodiment of the invention.

FIG. 7 is a schematic diagram of a table lamp 300 for illuminating a task area 320 of a table according to an exemplary embodiment of the invention. There is provided a plurality of light sources 330, as well as a control arrangement 340. Optionally, there may also be provided an observer position detection means 350, a task area position detection means 360, and an interface unit 370.

Each of the plurality of light sources 330 are adapted to emit light in a respective illumination direction 332 toward the task area 320. In other words, each of the plurality of light sources 330 may be placed in a different location and/or be configured to emit light in a different direction 332 toward the task area 320. For example, the table lamp 300 may comprise two light sources, one light source on a first side of the position of the observer 210 and the task area 320 and having an illumination direction 332 toward a second side, and another light source on the second side of the position of the observer 210 and the task area 320 and having an illumination direction 332 toward the first side.

As depicted, the table lamp 330 may comprise a string of LEDs 330, the string of LEDs 330 comprising the plurality of light sources. In other words, each of the plurality of lights sources 330 may be an LED. Each LED may be provided around the task area 320, such that the LEDs may have different respective illumination directions 332 toward the task area 320.

According to some embodiments, the table lamp 300 may optionally comprise a frame component configured to house the plurality of light sources 330. Put another way, the plurality of light sources 330 may be integrated in a frame component/unit, which may position the plurality of light sources 330 such that they have different respective illumination directions 332.

In some cases, the illumination direction 332 of at least one of the plurality of light sources 330 is configured to avoid specular reflection toward the position of the observer 210. This may be achieved by providing the light source on a first side of the observer 210 (i.e. a left side) and directing the light toward a second side (i.e. a right side).

Indeed, it may be preferable to have two light sources configured to avoid specular reflection toward the position of the observer 210 (i.e. one on the left side, and one on the right side). The illumination direction 332 of a first one of the plurality of light sources 330 may be from a first side of the observer 210 to a second side of the observer 210, and the illumination direction 332 of a second one of the plurality of light sources 330 may be from the second side of the observer 210 to the first side of the observer 210. In this way, homogenous horizontal illumination that minimises shadowing may be achieved.

Furthermore, a control arrangement 340 is provided, which is configured (for each of the plurality of light sources) to control the light source 330 to illuminate the task area of the table responsive criteria being met. Specifically, the specular peak intensity angle 270 of the light source 330 must be less than a reflected glare avoidance angle 272 corresponding to a position of an observer 210, and a sight angle 245 from the light source to the observer being greater than a direct glare avoidance angle 240 corresponding to the position of the observer.

In other words, the control arrangement 340 is configured to process a specular peak intensity angle of the light source 330 (corresponding to its illumination direction), along with a reflected glare avoidance angle (corresponding to a position of the observer 210) in order to predict/determine/ estimate whether (or indeed, to what degree) reflected light from the light source 330 may be incident to the eyes of the observer 210. Thus, each individual light source 330 may have an associated reflected light incidence relationship. If the relationship is such that the specular peak intensity angle 270 of the light source 330 is greater than a reflected glare avoidance angle 272, then the light source 330 may not illuminate the task area 320.

By way of example, the specular peak intensity angle 270 of the light source 330 may be an angle between a specular peak direction 260 of the light source 330 and a reference plane 280, and the reflected glare avoidance angle 272 may be an angle between the reference plane 280 and a direction between the position of the observer 210 and the position of the light source 330. In this case, the reference plane 280 may be perpendicular to a direction between the position of the observer 210 and a centre of the task area 320.

Further, the control arrangement determines whether and/or to what degree the observer 210 may suffer from a glare by directly seeing the light source 330.

Specifically, the control arrangement 340 is configured to process the illumination direction 332 of the light source 330 with a position of the observer 210, in order to determine whether light from the light source 330 may be directly seen by the observer 210. If the sight angle 245 from the light source to the observer 210 is less than a direct glare avoidance angle 240 corresponding to the position of the observer 210, then the light source 330 may not be controlled to illuminate the task area 320.

By way of example, the direct glare avoidance angle of the light source 330 may be an angle between the reference plane and a direction between a location of the light source 330 and the position of the observer 210. Indeed, the direct glare avoidance angle may be based on a field of view of the observer 210. In this case, the field of view of the observer 210 may be at least 50° from the direction from the position of the observer 210 and a centre of the task area 320.

Thus, the control arrangement 340 may control the plurality of light sources 330 so as to minimise the amount of light incident to the eyes of the observer 210 via spectral components of reflected light and directly from each light source 330.

In the case presented in FIG. 7, all of the light sources 330 above the dotted lines 380 may be turned on (as it may be determined that they are outside the field of view of the observer 210 and that specular components of reflection are not incident to the observer 210), while light sources 210 below the dotted lines 380 are turned off. Alternatively, the light sources 210 below the dotted lines 380 may be controlled to have reduced light intensity/illumination level, have altered illumination directions, and/or have a different color or color temperature.

Figure 8:
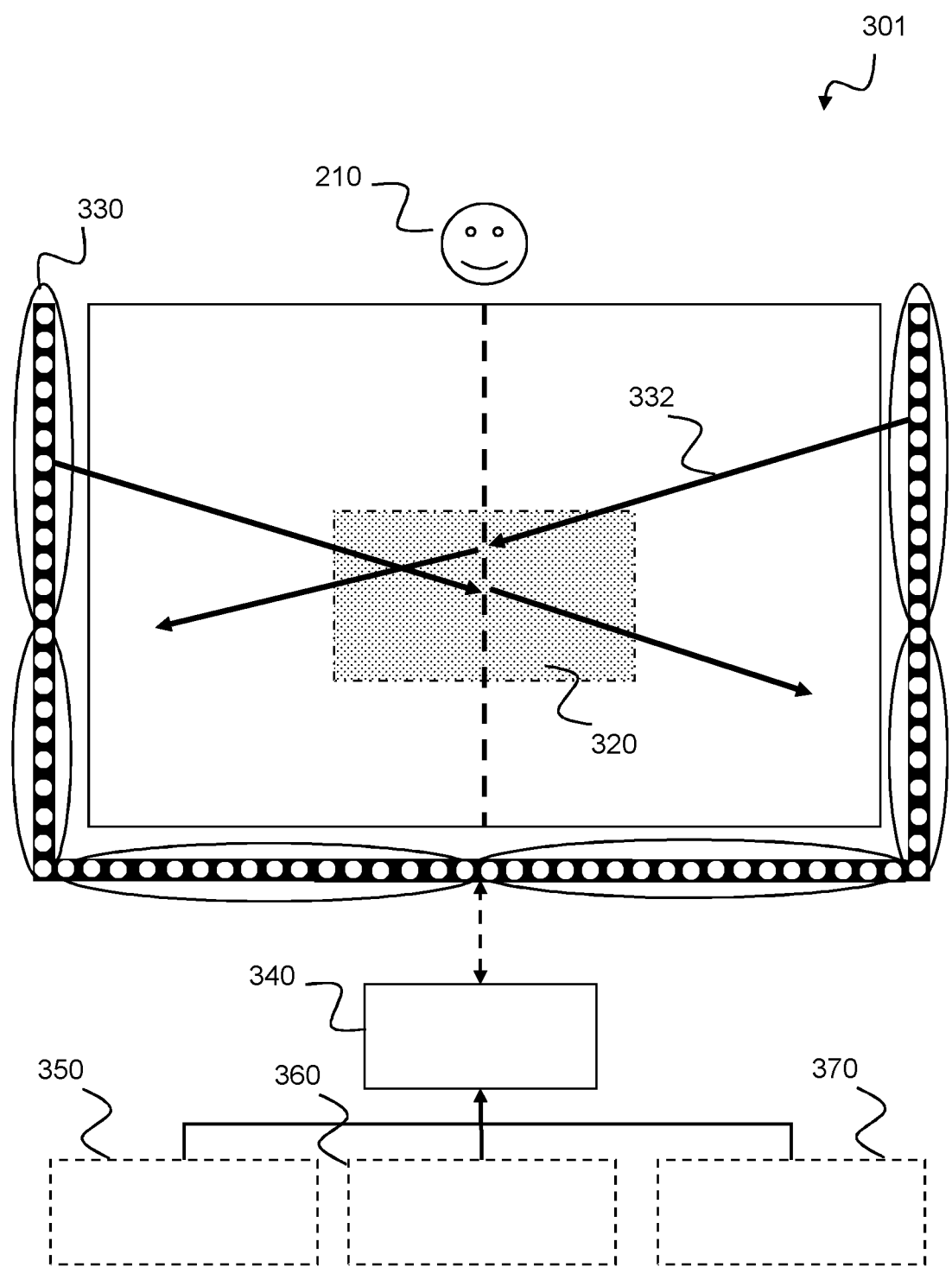
FIG. 8 is a schematic diagram of a table lamp for illuminating a task area according to another exemplary embodiment of the invention and FIGS. 9A and 9B present an isometric diagram of a table lamp according to a further embodiment of the invention in a deployed and retracted position, respectively.

FIG. 8 presents an alternative embodiment of the table lamp 301 depicted by FIG. 4. In particular, at least some light sources (i.e. LEDs) of the plurality of light sources 330 are clustered/grouped, such that computation of the whether reflected light is incident to the observer 210, and whether direct light is incident to the observer 210 may be simplified. In this case, only the two clusters nearest the observer 210 may be controlled to illuminate the task area 320, while the four clusters furthest from the observer 210 may be turned off or controlled to have a lower illumination intensity level.

Turning back to FIG. 7, in some embodiments the control arrangement 340 is configured to control each of the plurality of light sources 330 by at least one of: turning the light source 330 on, turning the light source 330 off, setting an illumination level of the light source 330, adjusting the illumination direction 332 of the light source 330, changing the color of the light source 330, and/or changing the color temperature of the light source 330.

For example, if it is determined that the light source 330 may cause the observer experience reflected and direct glare (i.e. due to not meeting the incidence criteria), then the control arrangement 340 may switch that light source 330 off. However, if it is indicated that only a small amount of reflected glare may be experienced, the control arrangement 340 may control the light source 330 to have a low illumination level (i.e. light intensity) instead of completely switching the light source 330 off. Furthermore, if the light sources 330 are configured to have adaptable illumination directions 332, then the control arrangement 340 may also alter the illumination directions 332 responsive to determining a high likelihood of glare. Alternatively, if the light sources 330 are configured to have an adaptable color/color temperature, then the control arrangement 340 may also change the color/color temperature responsive to determining a high likelihood of glare.

The position of the observer 210 may be a fixed (i.e. expected) position relative to the table lamp 300 and/or the task area 320. Indeed, it is often the case that an observer 210 is positioned at a static chair when observing a task area 320 using a table lamp 300. However, instead of a default position, the position of the observer 210 may be input to the control arrangement 340 by the observer 210.

As another alternative, the table lamp 300 may further comprise an observer position detection means 350 configured to detect the position of the observer 210. In this case, the position of the observer 210 may not be a default value, but may instead be updated as the observer 210 moves around the task area 320. For example, the observer position detection means 350 may be a camera and image recognition means capable of determining the position of the observer 210. Thus, the position of the observer 210 may be updated in real time, such that direct and/or indirect glare is avoided even as the observer 210 moves.

Moreover, the table lamp 300 may further comprise a task area position detection means 360 configured to determine a position of the task area 320. In this case, the reflected glare avoidance angle is further based on the position of the task area 320. Indeed, the table lamp 300 may be adapted to determine the presence of indirect glare for the observer 210 further based on a movable task area 320. The task area 320 of the table may correspond to any area of the table that the observer 210 is observing. This may be a default area (i.e. central between two light sources 330), or may be input by the observer 210. Alternatively, the task area position detection means 360 may provide a way of automatically determining the location of the task area 320 in real-time (i.e. as the observer 210 moves a book while they are reading).

In yet another embodiment of the invention, the table lamp 300 may comprise an interface unit 370 configured to receive light control instructions (i.e. a control signal) from the observer 210. In this case, the control arrangement 340 is further configured, for each of the plurality of light sources 330, to control the light source 330 based on the received light control instructions. In other words, the observer 210 (or another user) may control the plurality of light sources 330 to suit their individual needs.

Figure 9A:
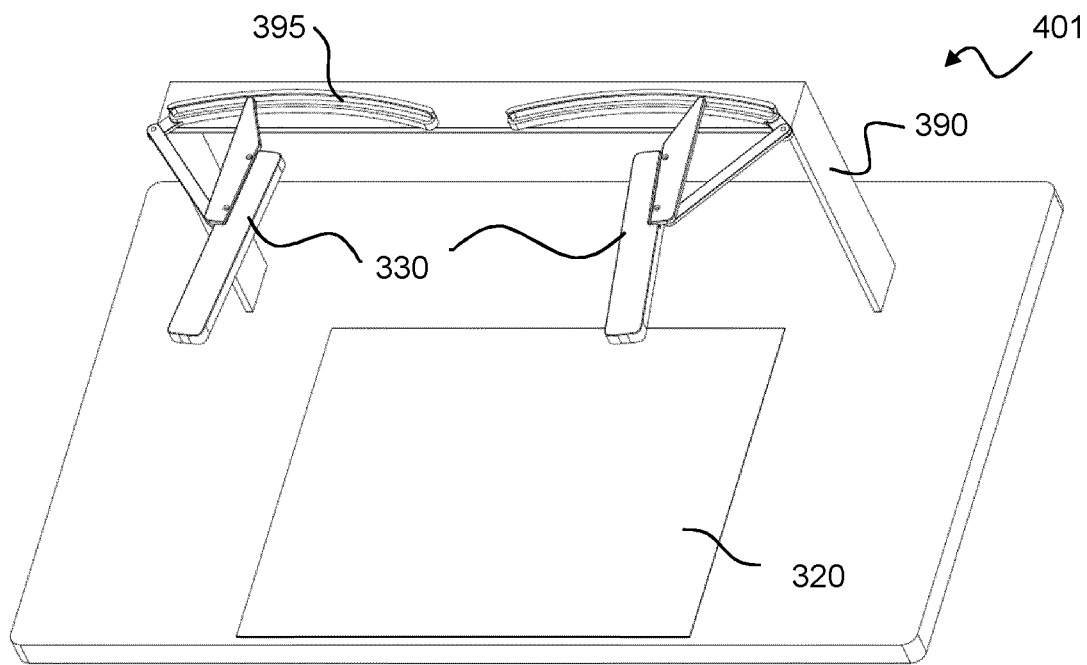
Figure 9B:
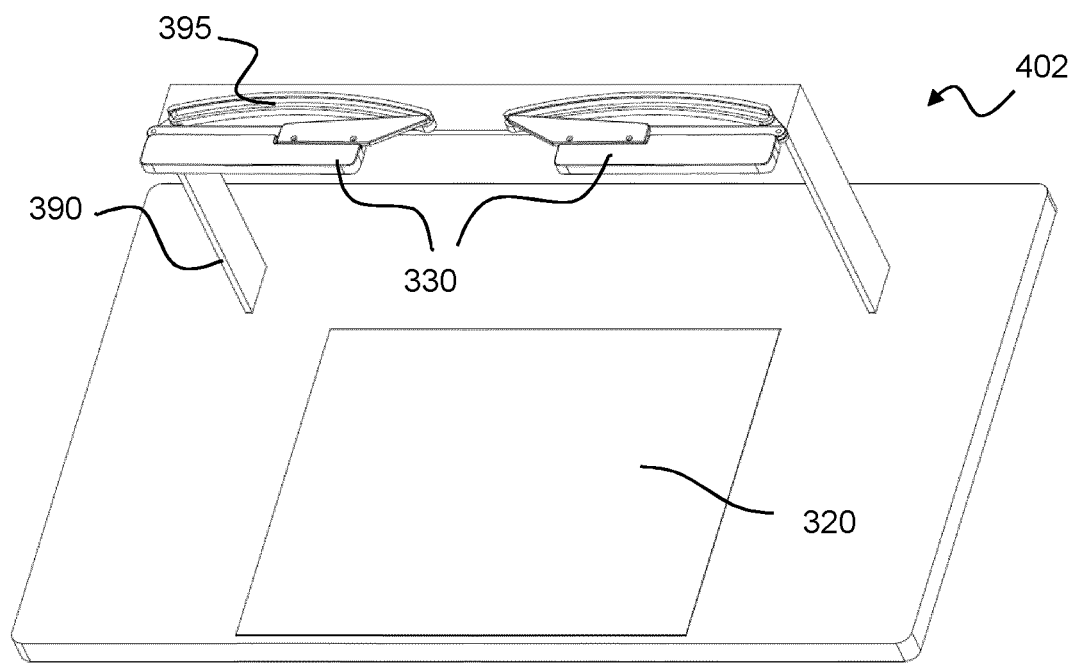

Moving on, FIGS. 9A and 9B present an isometric diagram of a table lamp according to a further embodiment of the invention in a deployed position 401 and retracted position 402, respectively.

The table lamp depicted in FIGS. 9A and 9B provide the plurality of light sources 330 in such a way that they are configured to be retractable from a first position 401 adapted to avoid specular reflection toward the position of the observer (i.e. satisfying the criteria described in reference to FIGS. 4, 5 and 6) to a second position 402 configured to save space (i.e. in line with a housing frame).

In the depicted embodiment, a housing frame 390 is provided to support the plurality of light sources 330 at a desired height above the task area 320. The second position 402 is a space saving position, and so is aligned with the housing frame 390. When deployed, the plurality of light sources 330 are moved from the second position 402 to the first position 401 by a rotatable means 395, such that they are provided to the right and left of the task area 320 (with respect to the observer). In this way, the illumination directions corresponding to the plurality of light sources 330 may be such that specular components of light are directed away from the observer.

Put another way, rotatable/foldable mechanisms 395 may be provided that support the plurality of light sources. In a space saving/folded status 402, the light sources may be placed in front of the observer. In this case, the observer may experience some level of glare. In an anti-glare/unfolded status 401, the plurality of light sources may be turned to a certain angle, such that indirect and direct glare may be eliminated, and contrast is improved.

Figure 10A:
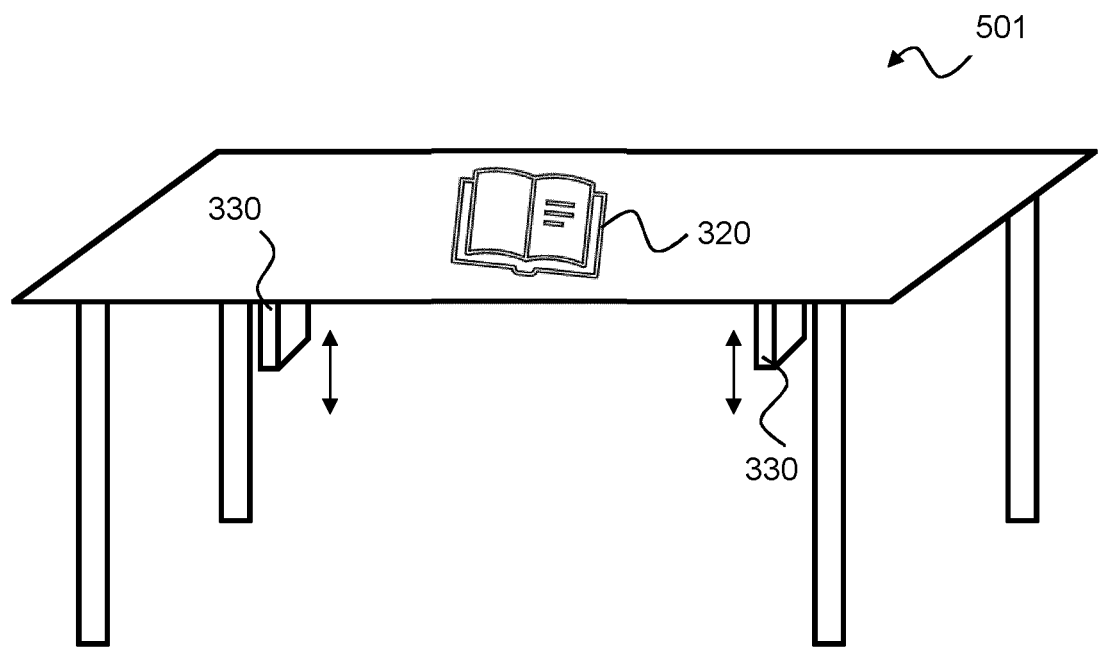
FIGS. 10A and 10B present an isometric diagram of a table lamp according to an alternative embodiment of the invention in a retracted and deployed position, respectively.
Figure 10B:
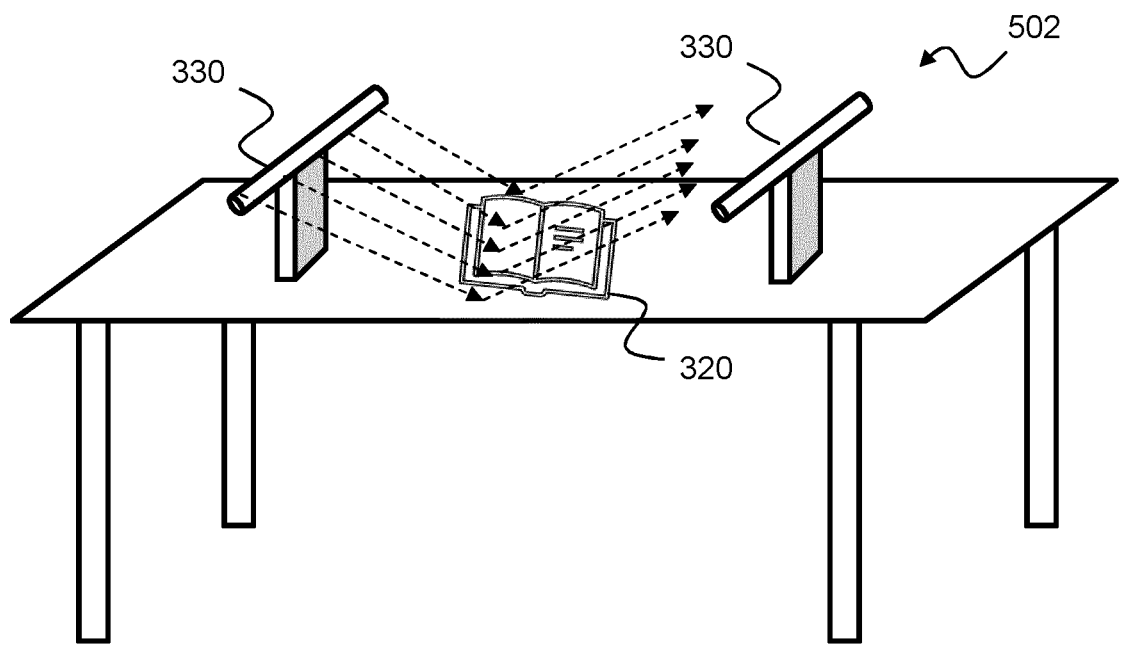

FIGS. 10A and 10B present an isometric diagram of a table lamp according to an alternative embodiment of the invention in a retracted position 501 and a deployed position 502, respectively.

As depicted, the light sources may be provided in a first (deployed) position 502 configured to avoid specular reflection toward the position of the observer. The plurality of light sources may be provided to the left and right of a task rea 320, and directed such that specular reflection into eyes of the observer may be avoided.

The light sources may then be moved to a second (space saving) position 501 lowered into the desk by a retracting mechanism in order to save space. When in the second position the light sources may not be able to illuminate the task area.

The mere fact that certain measures are recited in mutually different dependent claims does not indicate that a combination of these measures cannot be used to advantage.

Any reference signs in the claims should not be construed as limiting the scope.

The invention claimed is:

1. A table lamp for illuminating a task area of a table, the table lamp comprising:
a plurality of light sources, each light source being adapted to emit light in a respective illumination direction toward the task area; and
a control arrangement configured, for each of the plurality of light sources, to control the light source to illuminate the task area of the table responsive to:
a specular peak intensity angle of the light source being less than a reflected glare avoidance angle corresponding to a position of an observer; and
a sight angle from the light source to the observer being greater than a direct glare avoidance angle corresponding to the position of the observer;
wherein the specular peak intensity angle of the light source is an angle between a specular peak direction of the light source and a reference plane, and wherein the reflected glare avoidance angle is an angle between the reference plane and a direction between the position of the observer and the position of the light source, and wherein the reference plane is perpendicular to a direction between the position of the observer and a center of the task area; wherein the direct glare avoidance angle corresponds to a field of view of the observer;
wherein the directions and angles are delimited in a plane parallel to the task area on the table.

2. The table lamp of claim 1, wherein the field of view of the observer is at least 50° from the direction from the position of the observer and a center of the task area.

3. The table lamp of claim 1, further comprising an observer position detection means configured to detect the position of the observer.

4. The table lamp of claim 1, further comprising a task area position detection means configured to determine a position of the task area.

5. The table lamp of claim 1, wherein the task area of the table corresponds to an area of the table that the observer is observing.

6. The table lamp of claim 1, further comprising an interface configured to receive light control instructions from the observer, and wherein the control arrangement is further configured, for each of the plurality of light sources, to control the light source based on the received light control instructions.

7. The table lamp of claim 1, wherein the control arrangement is configured to control each of the plurality of light sources by: turning the light source on, turning the light source off, setting an illumination level of the light source, adjusting the illumination direction of the light source, changing the color of the light source, or changing the color temperature of the light source.

8. The table lamp of claim 1, further comprising a string of LEDs, the string of LEDs comprising the plurality of light sources.

9. The table lamp of claim 8, wherein at least one of the plurality of light sources comprises an LED cluster.

10. The table lamp of claim 8, wherein the illumination direction of at least one of the plurality of light sources is configured to avoid specular reflection toward the position of the observer.

11. The table lamp of claim 10, wherein the illumination direction of a first one of the plurality of light sources is from a first side of the observer to a second side of the observer, and wherein the illumination direction of second one of the plurality of light sources is from the second side of the observer to the first side of the observer.

12. The table lamp of claim 1, further comprising a frame component configured to house the plurality of light sources.

13. The table lamp of claim 1, wherein each of the plurality of light sources are configured to be retractable from a first position configured to avoid specular reflection toward the position of the observer to a second position configured to save space.

* * * * *